3 Sheets--Sheet 1.
W. FOULIS.
Apparatus for Charging and Drawing Gas Retorts.
No. 144,526. Patented Nov. 11, 1873.
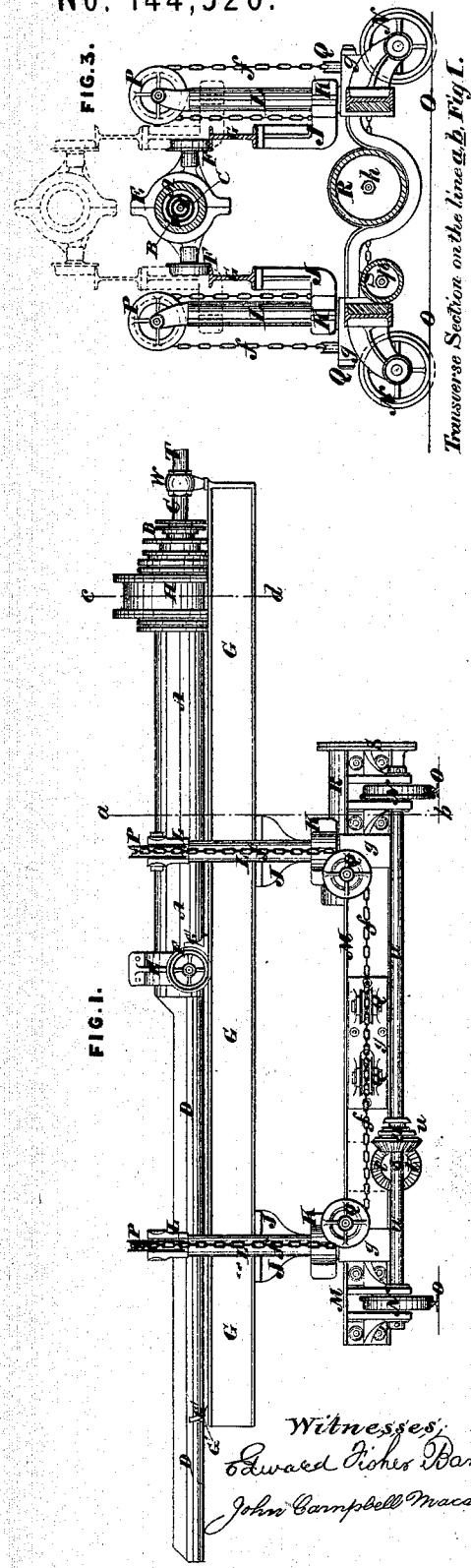
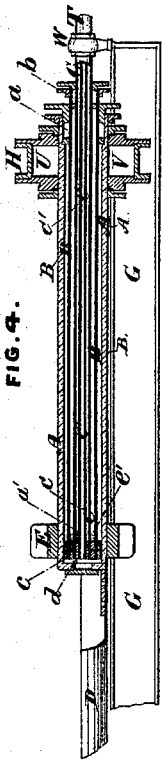
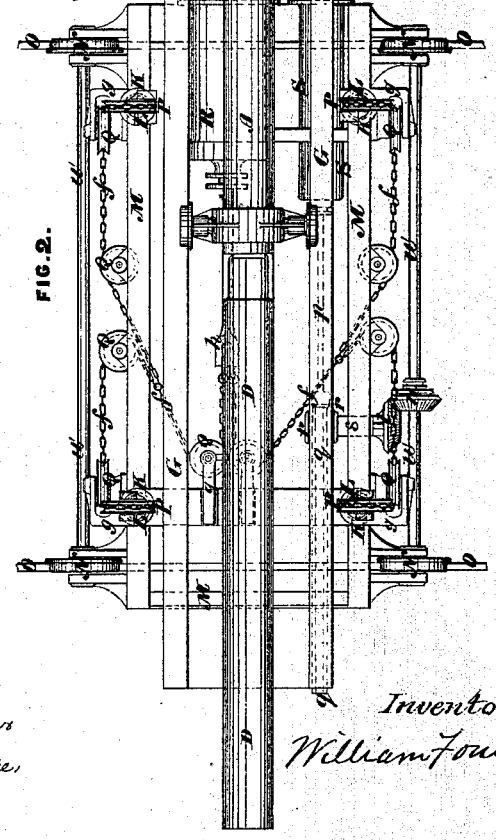
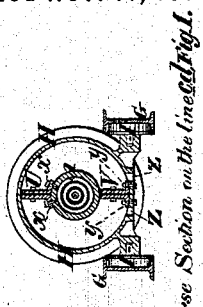
Witnesses:
Edward Fisher Bambus
John Campbell Macandie
Inventor,
William Foulis 3 Sheets--Sheet 2.
W. FOULIS.
Apparatus for Charging and Drawing Gas Retorts.
No. 144,526. Patented Nov. 11, 1873.
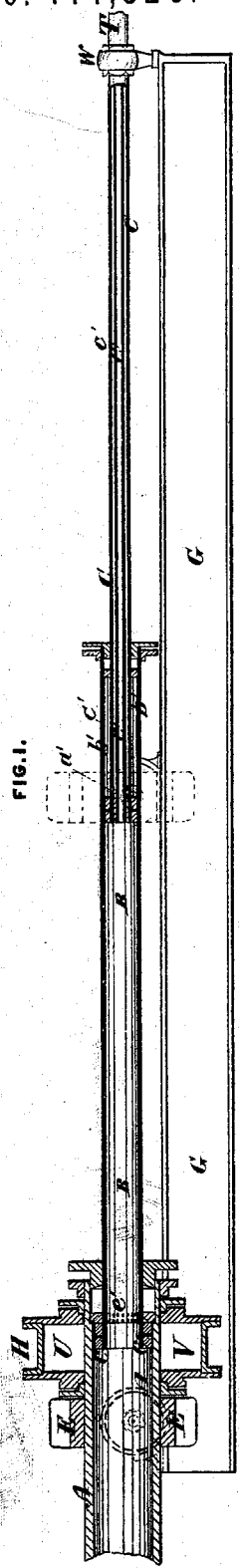
FIG. 1.
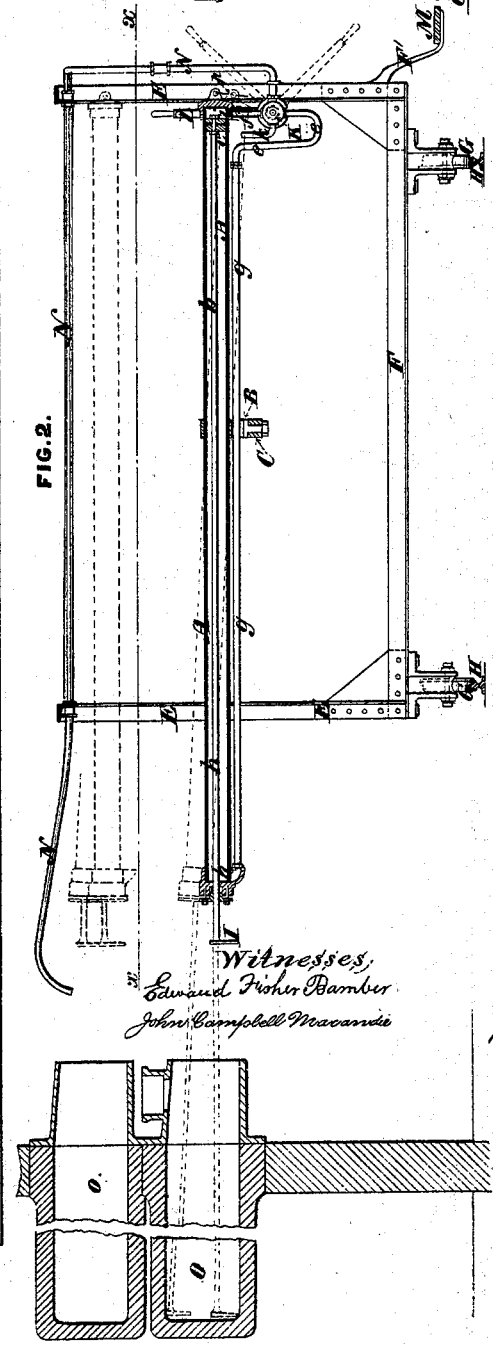
FIG. 4.
FIG. 2.
Witnesses,
Edward Fisher Bamber
John Campbell Macandie
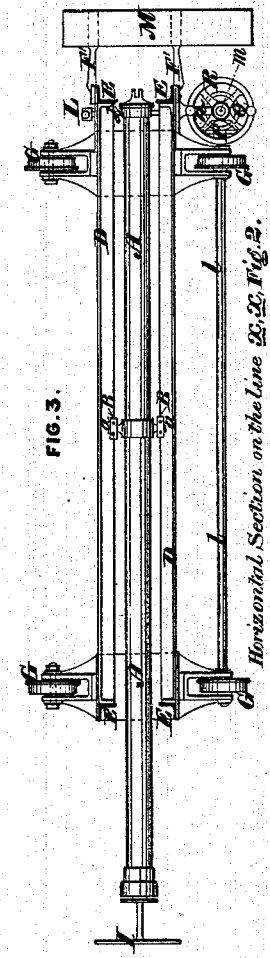
FIG. 3.
Inventor,
William Foulis

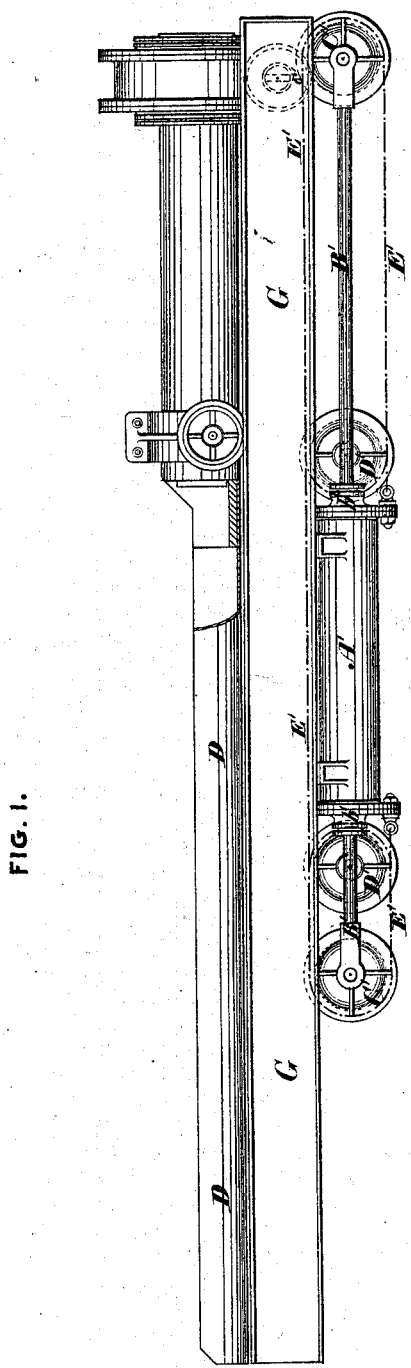

UNITED STATES PATENT OFFICE.

WILLIAM FOULIS, OF GLASGOW, NORTH BRITAIN.

IMPROVEMENT IN APPARATUS FOR CHARGING AND DRAWING GAS-RETORTS.

Specification forming part of Letters Patent No. 144,526, dated November 11, 1873; application filed September 13, 1873.

*To all whom it may concern:*

Be it known that I, WILLIAM FOULIS, of Glasgow, in the county of Lanark, North Britain, civil engineer, have invented Improvements in Charging and Drawing Retorts, and in the machinery or apparatus employed therefor, of which the following is a specification:

This invention, which relates to improvements in charging and drawing retorts, has for its objects to effect these operations more conveniently than hitherto.

On Sheet 1 of the drawings hereunto appended, Figure 1 is a side elevation of my improved retort-charging apparatus. Fig. 2 is a plan thereof, while Fig. 3 is a transverse section of the same on the line $a\,b$, Fig. 1.

As shown by these figures, the apparatus consists of a hydraulic cylinder, A, within which are situated other hydraulic cylinders or tubes, B and C, respectively, as shown more particularly at Fig. 4, in which figure the hydraulic cylinder A, with the internal cylinders or tubes B and C, is shown in vertical section. The cylinder A is connected to the cylinder or tube B by means of a gland and stuffing-box, $a$, so as to form a telescopic joint, while the cylinder or tube B is connected to the inner or stationary cylinder or tube C by means of a similar telescopic joint, $b$. Situated within the cylinder or tube C is the inlet-pipe $c'$, through which the water under pressure is passed when actuating the cylinders A and B, as hereinafter more particularly referred to. The inner extremities of the cylinders or tubes B and C are attached to pistons $c$ and $d$, respectively, the piston $c$ being fitted within the cylinder A, while the piston $d$ is constructed to fit within the cylinder or tube B. Attached to one end of the hydraulic cylinder A is the scoop D, in which the charge for the retort is placed. The cylinder A, with the scoop D, is supported within a loose bearing E, (the form of which is shown more particularly at Fig. 3,) through which the cylinder A is free to move. The loose bearing E is carried on rollers F, which rest on and traverse upon girders G. The rollers F are prevented from running off the girders G by means of checks G', as shown at Fig. 1. The cylinder A is also partly carried within a cylindrical chamber, H, hereinafter more particularly referred to, and this is supported on rollers I, which rest on and traverse upon the lower flange of the girders G, as shown more particularly at Fig. 5, which is a transverse section on the line $c\,d$, Fig. 1. The girders G are carried on brackets J, which are attached by guides K to vertical guide-pillars L. The guide-pillars L are mounted upon a platform or carriage, M, which traverses, on wheels N, a line of rails, O, situated parallel with the charging ends of the retorts. Attached to the guides K are chains $f$, which pass upward and over pulleys P, situate at the upper part of the guide-pillars L. The chains $f$ are conducted downward and pass round pulleys Q, carried by brackets $g$, attached to the platform or carriage M, and are finally connected to the piston $h$ of the hydraulic cylinder R, which is also carried by the carriage M. As the piston $h$ is acted upon by water under pressure being admitted into the cylinder R, the hydraulic cylinder A, with the scoop D, may be raised or lowered to suit the level of the retort about to be charged. As shown by the drawings, the scoop D and its connected apparatus is at its lowest level; but by causing the piston $h$ to travel to the opposite end of the cylinder R, the scoop D will be raised to its highest level, as indicated by the dotted lines at Fig. 3 of the drawings. The piston $h$ is secured in any position within the cylinder R by means of a pinching-screw (not shown on the drawings) acting on the piston-rod. A second hydraulic cylinder, S, is also situated in and supported by the carriage M. The piston-rod $p$ of the cylinder S is attached to a toothed rack, $q$, which gears with a pinion, $r$, situated at one end of a shaft, $f$. At the outer end of the shaft $s$ a bevel-pinion, $t$, is placed, which gears with a second bevel-pinion, $u$, carried on the shaft $u'$ of one of the pairs of wheels N. As the piston within the cylinder S is actuated, its motion is transmitted, through the toothed rack $q$ and pinion $r$, to the bevel-pinions $t$ and $u$, and the wheels N, thereby causing the carriage to move forward on the line of rails O. The bevel-pinion $u$ is provided with a clutch, $v$, by means of which it can be put into or out of gear with the bevel-pinion $t$, when required.

In charging a retort, the outward end of the hydraulic cylinder or tube C is connected, by means of a coupling-joint, $w$, and a flexible pipe, T, to a water-pressure main or pump, and the water under pressure, being admitted through the inlet-pipe $c'$, as shown more particularly at Fig. 4, fills the space between the ends of the pistons $c$ and $d$ and the ends of the hydraulic cylinder A. The pressure being still continued, the cylinder A, with the scoop D, is forced forward until it arrives at the end of the stroke, when the pressure, acting on the piston $d$, causes the cylinder or tube B to move forward, carrying with it the cylinder A and scoop D, until the scoop D is advanced into the retort. The position of the cylinder A and cylinders or tubes B and C is shown to an enlarged scale at Fig. 1, Sheet 2, of the drawings, as having arrived at the end of their forward stroke, in which position the scoop D is situated within the retort, ready to deposit the charge. In order to effect this, the scoop D and cylinder A are partially rotated on their axes, so as to deposit the charge in the retort. This operation is effected by means of the cylindrical chamber H, through which the cylinder A passes. The cylindrical chamber H is divided by feathers U and V, respectively, as shown more particularly at Fig. 5, Sheet 1, of the drawings. The feather U is attached, by means of studs and nuts $x$, or their equivalent, to the cylinder A, while the feather V is similarly attached to the lower part of the cylindrical chamber H. An opening, $z$, is situated on each side of the fixed feather V, through one of which openings water under pressure is admitted. As water is admitted under pressure through one of the openings $z$, the space within the cylindrical chamber H on that side of the feathers U and V becomes filled therewith; and as the pressure is continued, the feather U, and with it the cylinder A and scoop D, to which it is attached, is forced round within the chamber H, thereby partially rotating or inverting the scoop D, so that it deposits the charge in the retort. In lieu of these means for partially rotating or inverting the scoop D and cylinder A, as hereinbefore described, a short hydraulic cylinder, with chains, a rack, and pinion, or the mechanical equivalent of either of these, acting on the cylinder A, so as to partially rotate or invert it with the scoop D, may be used. When the charge is thus deposited in the retort, the scoop D is withdrawn. This is effected by causing the water to act upon the cylinders or tubes A and B in the reverse of that hereinbefore described, and which will be better understood by referring to the enlarged sectional view of the hydraulic cylinders, Fig. 1, Sheet 2, of the drawings. The water under pressure is cut off from the inlet-pipe $c'$, and is admitted into the cylinder or tube C. Situated around the circumference of the cylinder or tube C, and close to the piston $d$, are a series of perforations, $a'$, through which the water issues until it fills the annular space $b'$; and as the pressure continues it acts upon the end of the cylinder or tube B until it is drawn back, with the cylinder A and scoop D, to the end of its backward stroke, in which position the piston $c$ becomes situated over the piston $d$—the position which it is in at starting for the forward stroke. The water then passes through perforations $e'$ formed in the cylinder or tube B, close to the piston $c$, and, entering the cylinder A, thereby forces it backward, with the scoop D, until the entire apparatus is again in the position shown on Sheet 1 of the drawings, ready to commence another forward or charging stroke.

A cock may be provided at any suitable position in the hydraulic apparatus, for allowing the water which has been used for forcing it outward to escape when the return stroke is commenced; or the water may be forced back through the tube $c'$, as is well understood in connection with hydraulic mechanism.

In place of withdrawing the scoop D, by causing the water under pressure to act on the cylinders or tubes in a reverse way, as hereinbefore described, and shown on the accompanying sheets of drawings, chains, racks, and pinions, or other such apparatus commonly used for drawing back hydraulic rams, may be adopted.

On Sheet 3 of the drawings hereunto appended is shown a portion of another modification of the retort-charging apparatus in side elevation, in which the use of the telescopic joints shown on Sheets 1 and 2 of the drawings for actuating the scoop D is avoided, by placing a hydraulic cylinder, A' below the scoop D, as shown, the cylinder A' being attached to one of the girders G.

The extremities of the piston-rod B', which pass through stuffing-boxes $b'$, formed on each end of the cylinder A', are provided with pulleys C'. A fixed pulley, D', is also situated near each end of the cylinder A'. A chain, E', is attached at each extremity to opposite ends of the cylinder A'. The chain E' is passed around the pulley C' and fixed pulley D'. It is then conducted back and passed again around the pulley C', from whence it passes to the other end of the cylinder A', and around the other pulleys, C' and D', respectively, situated at that end in a similar manner. The chain E' is attached, by means of a link, $c'$, or its equivalent, to the rear end of the scoop D, and, according to the direction in which the piston travels within the cylinder A', the scoop is advanced into or withdrawn from the retort. The chain E' is reduplicated and passed around the fixed pulleys D', as hereinbefore described and shown, in order to obtain an increase of horizontal travel for the scoop D, relatively with that of the piston within the cylinder A'.

In lieu of using either of the arrangements of apparatus hereinbefore described, and illustrated on the accompanying sheets of drawings, for actuating the scoop D, a hydraulic-pressure cylinder may be employed therefor, the piston-rod of which may be attached direct to the rear end of the scoop D, in which case the stroke of the piston within the cylinder requires to be the same as the travel of the scoop D.

Fig. 2, Sheet 2, of the drawings is a vertical section of my improved apparatus for drawing retorts. Fig. 3 is a horizontal sectional plan thereof on the line $x$ $x$, Fig. 2; while Fig. 4 is an end elevation of the same. As shown by these figures, the apparatus consists of a hydraulic cylinder or tube, A, which is supported on trunnions $a$, situated at the central part thereof in a swivel-bearing, B, which is carried in a bracket, C, attached to side rails D, which, with the vertical standards E, constitute the framing of the apparatus. The cylinder or tube A is capable of being moved on the trunnions $a$, so as to raise or lower the front end, as indicated by the dotted lines at Fig. 2, Sheet 2; or the cylinder or tube A may be turned either to the right or left, as may be required, by means of the swivel-bearing B. The standards E are attached to and supported by a carriage, F, which traverses, on wheels G, a line of rails, H, situated parallel with the drawing ends of the retorts. A drawing-rake or its equivalent, I, is attached to the extremity of the piston-rod $b$ of a piston, $c$, which is operated within the cylinder or tube A. A four-way cock, K, is attached to the standard E below the back end of the cylinder or tube A. Attached to the spindle $d$ of the cock K is a handle, L, which is seen more particularly at the end elevation, Fig. 4, Sheet 2, by means of which the attendant, who stands on a platform or step, M, attached to the carriage F by brackets F', actuates the apparatus. Leading from the four-way cock K are two flexible pipes, $e$ and $f$, respectively, the pipe $e$ being coupled to a pipe, $g$, situated below the cylinder or tube A, and which is attached to the inlet $h$ at the front end of the cylinder or tube A. The flexible pipe $f$ is attached to the inlet $i$, situate at the rearward end of the cylinder or tube A. The water under pressure is admitted to the four-way cock K by means of the pipe $k$; and as the handle L is turned into either of the positions indicated by the dotted lines at Fig. 2, the water is admitted into the cylinder or tube A at that side of the piston $c$ in which it is, or may be, required to act. A pipe, N, is conducted from the cock K, as shown more particularly at Fig. 2, Sheet 2, to the front end of the apparatus, and it terminates over the entrance of the retorts O. As the rake, or its equivalent, I, (which is indicated in dotted lines within the retort O,) draws out the charge of coke, water is passed through the pipe N from the cock K, and it is thus thrown on the hot coke as the latter falls from the retort $o$. A bevel-pinion, P, is attached to one end of the axle $l$ of one pair of the wheels G. The bevel-pinion P gears with a second bevel-pinion, Q, attached to the lower end of a spindle, $m$, which is supported in brackets $n$ attached to the standard E. At the upper end of the spindle $m$ a hand-wheel, R, is situated, which, on being turned by the attendant, causes the carriage F to travel along the line of rails H in whichever direction may be required. A pulley, $o$, is situated on the spindle $d$, around which a chain, $p$, passes. This chain is attached to the rearward end of the cylinder or tube A.

As the handle L is moved, the pulley $o$ is partially rotated, and it, by means of the chain $p$, elevates or depresses the front end of the cylinder or tube A.

In cases where there are two or three rows of retorts situated at different levels, two or more cylinders or tubes A may be arranged in the one framing, as indicated in dotted lines at Fig. 2.

It is obvious that the same apparatus which is used for charging, as hereinbefore described, and shown on Sheets 1 and 2 of the drawings, may also be used for drawing retorts by employing either the charging-scoop or drawing-rake, as required. It will, however, generally be more convenient to have separate apparatus for each operation. It is also obvious that the apparatus hereinbefore described, and shown on Sheets 1 and 2 of the drawings, may be operated by compressed air or steam, or other fluids or liquids. Lastly, it is to be understood that, although the hydraulic apparatus hereinbefore described, and shown on the annexed drawings, is represented in connection with a carriage or movable platform, yet it is obvious that other arrangements of carriage or platform than that which I have shown may be adapted to the same hydraulic apparatus. The carriage shown indicates only one such arrangement thereof, which may be used for supporting the hydraulic charging or drawing apparatus.

I claim—

1. An apparatus for charging or drawing retorts, in which the scoop or rake is combined with and operated by the piston-rod of a water or other fluid engine, as set forth.

2. The combination, in a retort charging or drawing apparatus, of a series of concentric cylinders and pistons, sliding one within the other telescopically, and operated by water or other fluid, as specified.

3. The combination, with the cylinder or cylinders, of a casing, H, and vanes U V, or equivalent devices, by which water or other fluid may be made the means of rotating the cylinder.

4. The combination, with a drawing or charging apparatus, of water-engines, connected to and operating the propelling and elevating mechanism, as set forth.

In testimony whereof I have signed my name to this specification in the presence of two subscribing witnesses.

WILLIAM FOULIS. [L. S.]

Witnesses:
JOHN CAMPBELL MACANDIE,
EDWARD FISHER BAMBER.